US006583773B1

(12) United States Patent
Nogami et al.

(10) Patent No.: US 6,583,773 B1
(45) Date of Patent: Jun. 24, 2003

(54) DISPLAY APPARATUS AND DISPLAY DRIVE MECHANISM FOR VEHICLE

(75) Inventors: Takuya Nogami, Hitachinaka (JP); Kentaro Yasumatsu, Hitachinaka (JP)

(73) Assignee: Xanavi Informatics Corporation, Zama (JP)

( * ) Notice: Subject to any disclaimer, the term of this patent is extended or adjusted under 35 U.S.C. 154(b) by 153 days.

(21) Appl. No.: 09/612,658

(22) Filed: Jul. 7, 2000

(30) Foreign Application Priority Data

Jul. 15, 1999 (JP) ............................................ 11-202035

(51) Int. Cl.[7] ............................. B60K 35/00; G09F 9/00
(52) U.S. Cl. ........................... 345/7; 345/905; 248/917; 312/24; 349/58
(58) Field of Search ............................... 345/5, 7, 905, 345/87; 248/917, 922; 312/10.1, 21, 22, 23, 26, 30, 319.7; 349/58

(56) References Cited

U.S. PATENT DOCUMENTS 5,173,686 A    12/1992   Fujihara 6,011,685 A *  1/2000   Otsuki ........................ 361/679

FOREIGN PATENT DOCUMENTS

JP      04325370      11/1992
JP      10029446       2/1998

* cited by examiner

*Primary Examiner*—Steven Saras
*Assistant Examiner*—William Spencer
(74) *Attorney, Agent, or Firm*—Crowell & Moring LLP

(57) ABSTRACT

A display drive mechanism for vehicle slidingly moves a display assembly between a stored position and a projected position by the drive force of a motor. The display drive mechanism comprises a rotating body which is rotationally driven by the motor. A projecting portion for example projects from the rotating body at a position eccentric to its axis of rotation. A long slot in the display assembly is engaged with the projecting portion. The display assembly is driven to and fro in both directions between the stored position and the projected position, as the rotating body rotates.

16 Claims, 11 Drawing Sheets

DISPLAY APPARATUS AND DISPLAY DRIVE MECHANISM FOR VEHICLE

INCORPORATION BY REFERENCE

The disclosure of the following priority application is herein incorporated by reference: Japanese Patent Application No. 11-202035 filed Jul. 15, 1999.

BACKGROUND OF THE INVENTION

1. Field of the Invention

The present invention relates to a display drive mechanism and a display apparatus for vehicle which slidingly move a display between a stored position and a projected position by the drive force of a motor.

2. Description of the Related Art

As a display apparatus for vehicle, there is a known type (for example, Japanese Laid open Utility Model Application No. Heisei 4-67550) which uses a display such as a liquid crystal monitor or the like embedded in a dashboard, and in which the display can be slidingly moved from the dashboard to a projected position.

With this type of sliding display apparatus it is necessary to maintain a high quality feeling in the operation of the display, while precluding the possibility of the display sinking down from its projected position under its own weight.

SUMMARY OF THE INVENTION

The objective of the present invention is to propose a display drive mechanism and a display apparatus for vehicle, in which a display can be moved with a high quality feeling.

Another objective of the present invention is to propose a display drive mechanism and a display apparatus for vehicle, in which the display does not sink down from its projected position under its own weight without a stopper.

The present invention is applied to a display drive mechanism for vehicle in which a display assembly is slidingly moved between a stored position and a projected position by the drive force of a motor.

The display drive mechanism for vehicle according to the first invention comprises a rotating body which is rotationally driven by the motor, a projecting portion which projects from either one of rotating body and display assembly, and a groove which is provided to the other of rotating body and display assembly and which is engaged with the projecting portion. The display assembly is driven to and fro in both directions between the stored position and the projected position by cam action of the projecting portion and the groove, as the rotating body rotates.

According to the first invention mentioned above, it is possible to provide a high quality feeling to the operation of the display with the minimum amount of mechanism, and without any requirement for fine control of the operation of the motor.

In particular, if the projecting portion is provided to the rotating body, while the groove is provided to the display assembly and extends in a direction perpendicular to the direction of sliding of the display assembly, then even if an external force is applied to the display assembly in the direction to push it towards its stored position, this force is not transformed into a force to rotate the motor in the opposite direction. Accordingly it is possible to prevent inadvertent movement of the display towards its stored position, without providing any particular lock mechanism.

It is preferable to provide mutually parallel first and second guide rods that guide the sliding of the display assembly, spaced apart along a first direction substantially perpendicular to the direction of projection of the projecting portion. In this constitution, the display drive mechanism for vehicle can be constituted as follows.

The first engaging portion on the display assembly engages with the first guide rod slidably in an axial direction of the rods in a state in which movement in the first direction is inhibited. A second engaging portion on the display assembly engages with the second guide rod slidably in an axial direction of the rods in a state in which movement in the first direction is permitted. The rotating body is disposed nearer to the first guide rod than to the second guide rod.

The display drive mechanism for vehicle according to the second invention comprises a pair of rotating bodies which are arranged along a direction perpendicular to the sliding direction of the display assembly and synchronously rotationally driven by the motor; a pair of projecting portions, each of which projects from each of rotating bodies at a position thereof eccentric to its center of rotation; and a pair of long grooves, each of which is provided to the display assembly and engaged with the projecting portion. The display assembly is driven to and fro in both directions between the stored position and the projected position by movement of each of the projecting portions in the groove, as the rotating body rotates in one rotational direction.

According to the second invention, since a pair of rotating bodies are provided and these are arranged along a direction perpendicular to the sliding direction of the display assembly, even if the display is quite wide no undue moment acts upon it, and thus the display can be driven smoothly. If the long groove extends substantially perpendicular to the sliding movement of the display assembly, it is possible to prevent inadvertent movement of the display towards its stored position, without providing any particular lock mechanism.

The display drive mechanism for vehicle according to the third invention is constituted as follows.

Mutually parallel first and second guide rods are provided and spaced apart along a first direction to guide the sliding of the display assembly. The first engaging portion on the display assembly engages with the first guide rod slidably in an axial direction of the rods in a state in which movement in the first direction is inhibited. The second engaging portion on the display assembly engages with the second guide rod slidably in an axial direction of the rods in a state in which movement in the first direction is permitted.

According to the third invention, even if a certain amount of dimensional deviation is present between the pair of guide rods and the engaging portions, it is possible to absorb this deviation without any sticking occurring between these members, and thereby the display can be driven smoothly.

The display assembly for vehicle according to the present invention is constituted of the above-noted display drive mechanism and a display assembly driven by the display drive mechanism.

The display assembly for vehicle according to another invention which slidingly moves the display assembly between the stored position and the projected position comprises a support member which supports the display drive mechanism in position, and a guide mechanism which is supported in position by the support member and guides the movement of the display assembly.

According to this invention, since a drive mechanism which transmits driving force to the display assembly and a guide mechanism which guides the movement of the display assembly are both supported in position by the common support member, thereby the positional accuracy between the two of them can be very high, and it is possible to suppress to a minimum level jerkiness, attributable to mounting inaccuracy, in the movement of the display unit.

In these display apparatus for vehicle, it is preferable that the substantially upper half portion of the screen of the display assembly is exposed from an installation surface at the stored position and an entire screen of the display assembly is exposed from the installation surface at the projected position. In this case, a movement amount of the display assembly is substantially half of a screen size of the display assembly in a movement direction of the display assembly.

DESCRIPTION OF THE PREFERRED EMBODIMENTS

Preferred Embodiment 1

A first preferred embodiment of the present invention will now be described with reference to FIGS. 1 through 5.

Figure 1:
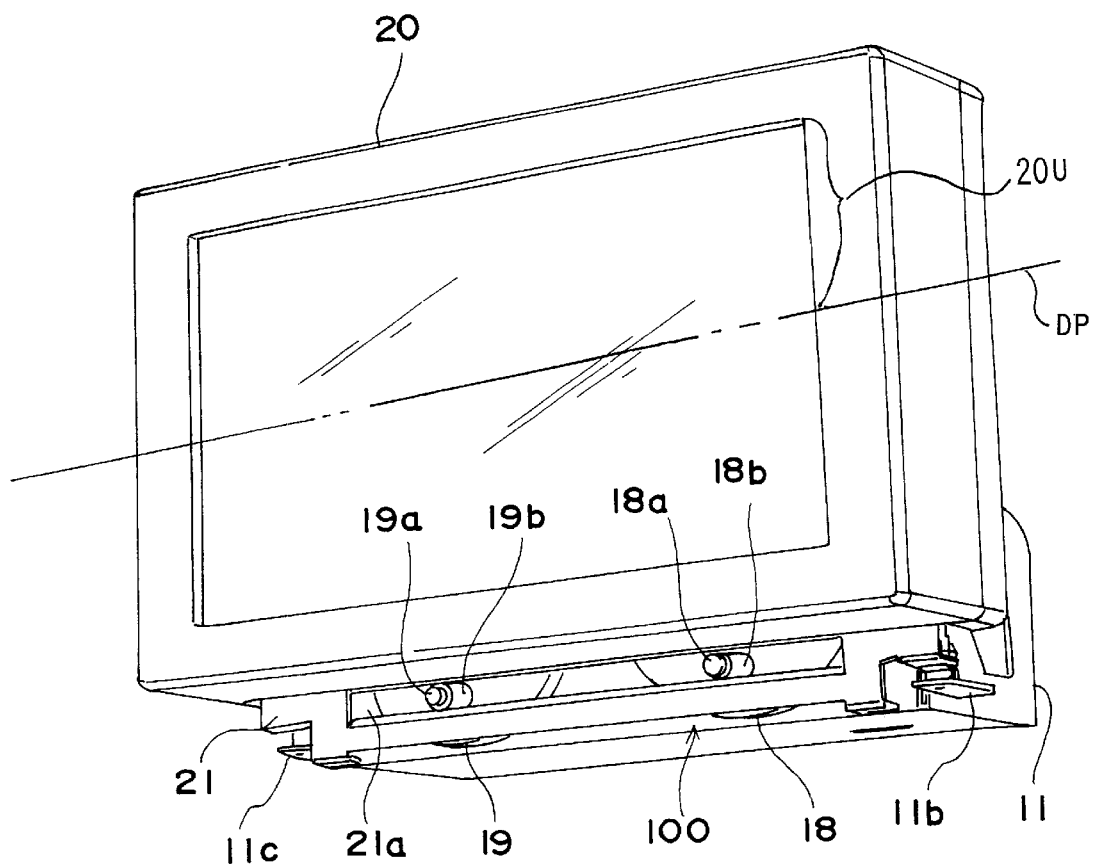
FIG. 1 is a perspective view of a display apparatus for vehicle according to a first preferred embodiment of the present invention as seen from the front, shown in a state with a display in a stored position.
Figure 2:
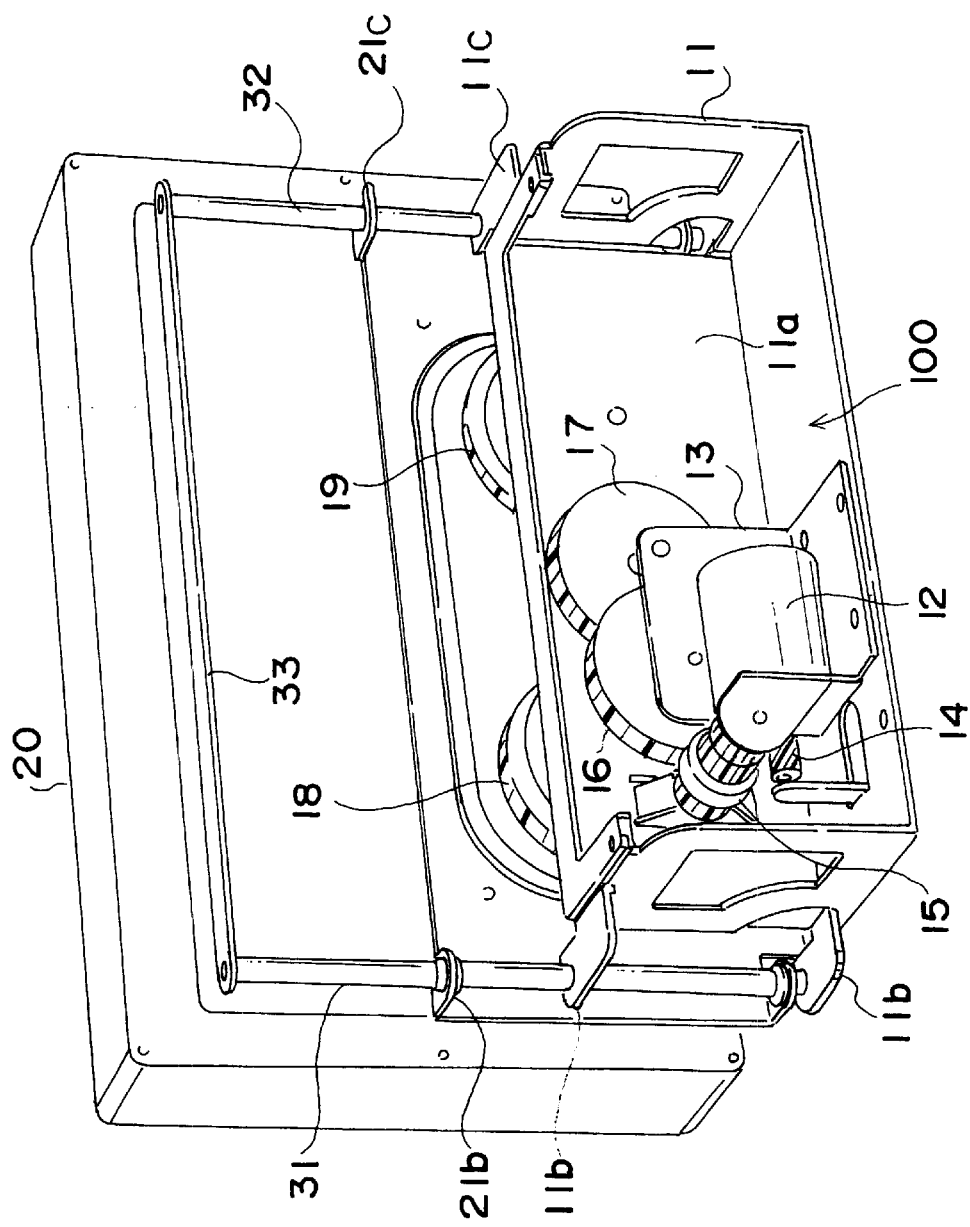
FIG. 2 is a rear view of the display apparatus of FIG. 1.
Figure 3:
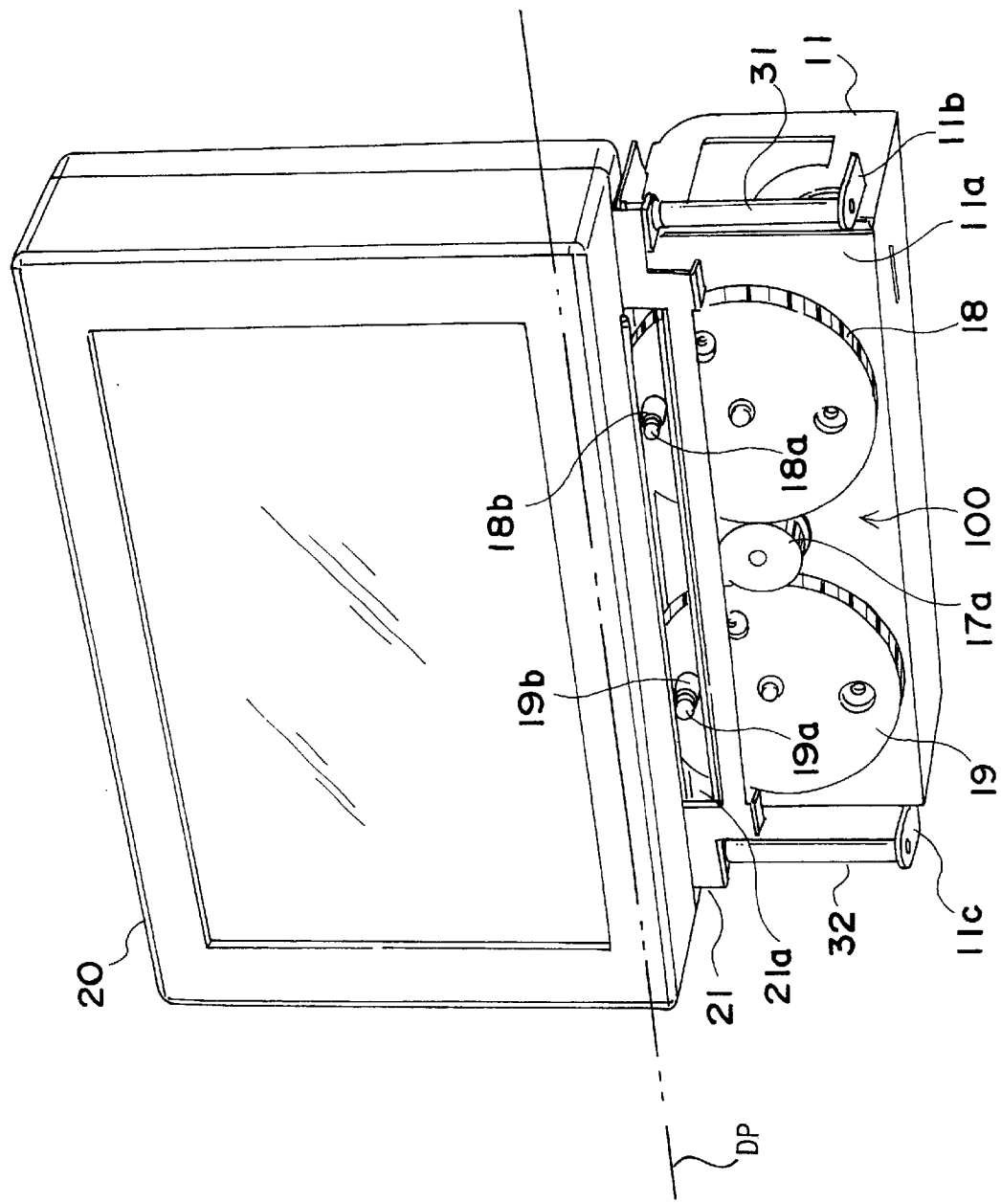
FIG. 3 is similar to FIG. 1, but shows the apparatus in a state with the display in a projected position.
Figure 4:
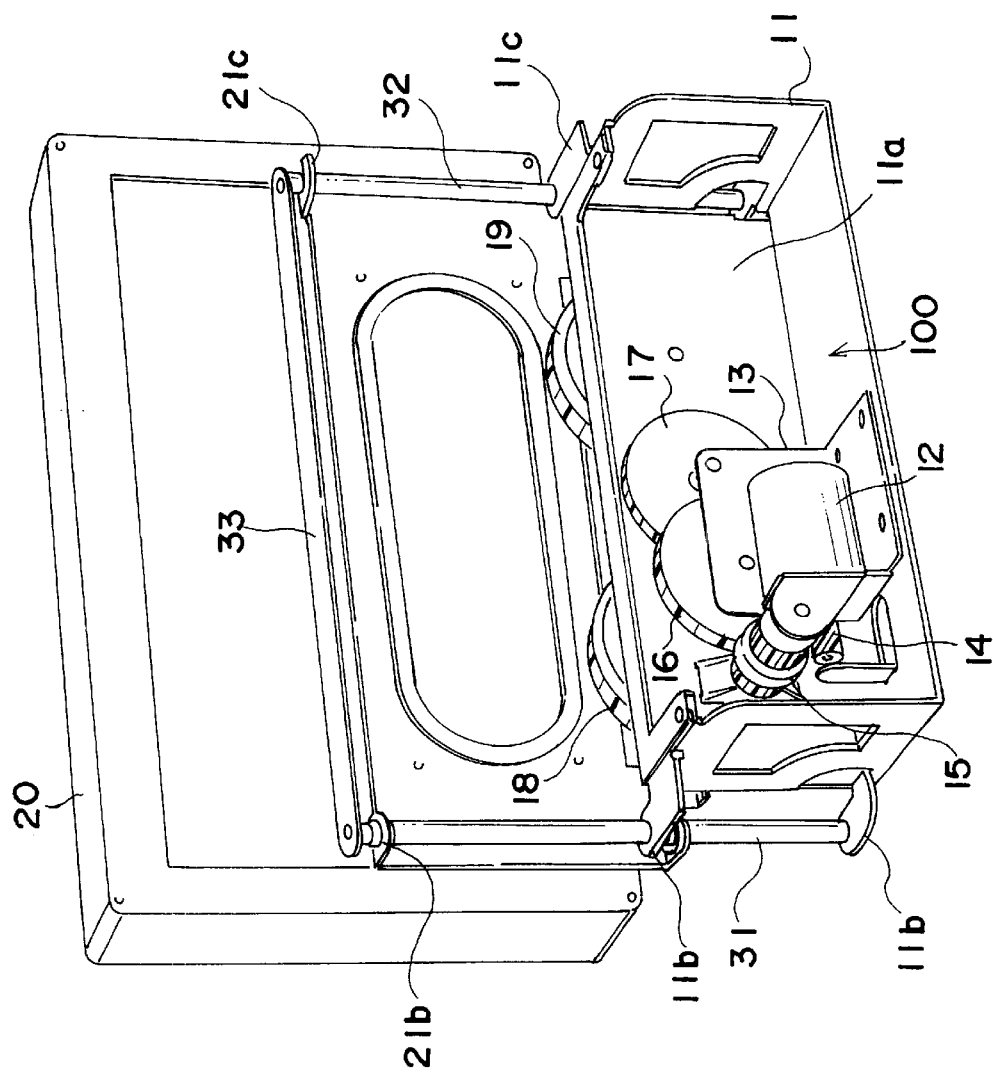
FIG. 4 is similar to FIG. 2, but shows the apparatus in the state with the display in the projected position.
Figure 5:
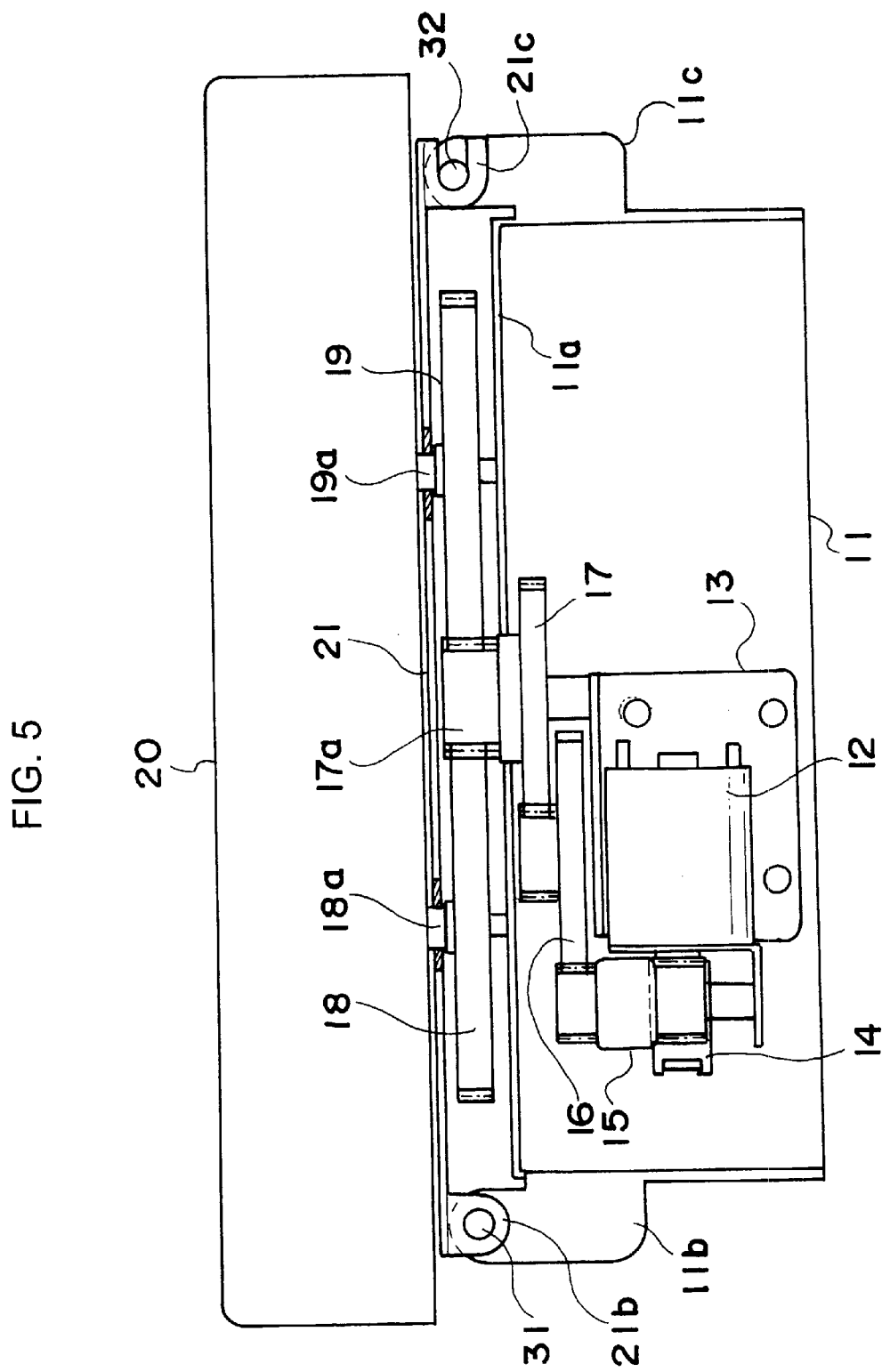
FIG. 5 is a plan view of the display apparatus of FIG. 1.

FIGS. 1 through 4 are perspective views as seen from the front and the rear of a display apparatus for vehicle according to this first preferred embodiment, while FIG. 5 is a plan view thereof. This display apparatus comprises a display drive mechanism 100 which is embedded in a dashboard DP in a vehicle passenger compartment, and a display 20 which is slidingly moved by the drive mechanism 100 between a stored position and a projected position. FIGS. 1 and 2 show the state in which the display 20 is in its stored position, and in this state only the upper portion 20U of the display 20 projects above the dashboard DP, and only the information etc. displayed in the upper portion 20U of the screen is exposed to be visible. When display projection operation is performed, the display 20 is slidingly moved to its projected position shown in FIGS. 3 and 4. In this projected position the entire display 20 projects from the dashboard DP, so that its entire screen is exposed to show a television image or map information from a navigation system or the like.

The display drive mechanism 100 will now be explained in detail.

A motor 12 which can rotate in one direction only is fixed via a bracket 13 sidewise upon a bottom plate portion of a base 11, and its rotation is transmitted via a worm 14 and gear members 15 and 16 to a gear member 17. Each of the gear members 15 through 17 is positioned and supported between the aforesaid bracket 13 and a standing wall portion 11a of the base 11. A gear portion 17a of the gear member 17 passes through an aperture formed in the standing wall portion 11a, and a pair of gears (flat gears) 18 and 19 are meshed with this gear portion 17a. These gears 18 and 19 are arranged symmetrically on the left and right of the central axis of the display 20 along its lengthwise direction (which is perpendicular to its slide direction), and each of them is rotatably supported by the standing wall portion 11a. Pins 18a and 19a project from the gears 18 and 19 respectively at positions eccentrically displaced from their rotational axes, and respective rollers 18b and 19b are rotatably supported upon these pins 18a and 19a. These rollers 18b and 19b are engaged into a long slot 21a formed in a display support member 21 along its horizontal direction (which is perpendicular to the slide direction of the display 20), and move along this long slot 21a while rotating. The display 20 is fixed to the display support member 21 by a plurality of screws. The gears 18,19 are rotating member.

Support portions 11b and 11c which project from the sides of the base 11 support respective guide shafts 31 and 32 so as to hold them both extending in parallel to the display drive direction, and a plate member 33 bridges across between the top portions of these guide shafts 31 and 32. Engagement portions 21b and 21c of the display support member 21 are engaged with the guide shafts 31 and 32 so as to be slidable thereon, so that the sliding motion of the display 20 is guided.

As shown in FIG. 5, referring to the portions of the engagement portions 21b and 21c that engage with the shafts, the one on one side is formed as a hole portion, while the one on the other side is formed as a slot. In other words, the position of the display 20 with respect to a one 31 of the guide shafts (reference shafts) is restricted to be positioned both in the fore and aft direction and in the left and right direction, while, with respect to the other one 32 of the guide shafts, the position of the display 20 is restricted only in the fore and aft direction but not in the left and right direction.

The operation of the display apparatus structured as above will now be described.

In the stored position as shown in FIGS. 1 and 2, the pins 18a and 19a of the gears 18 and 19 are positioned at the bottoms of their circumferences, and only the upper portion of the display 20 projects from the dashboard DP. In this state, when the action of display projection is to be performed, the motor 12 is driven in its predetermined rotational direction, and its rotation is transmitted via the worm 14 and the gear members 15 and 16 to the gear member 17. The pair of gears 18 and 19 are synchronously rotated in the same rotational direction by the rotation of the gear portion 17a of the gear member 17, and along with this the pins 18a and 19a (and the rollers 18b and 19b) execute circular motion while sliding in the long slot 21a. The motion of the pins 18a and 19a in the upwards direction pushes the display support member 21 upwards via the wall surface of the long slot 21a, and the support member 21 rises upwards while being guided by the pair of guide shafts 31 and 32, so that the display 20 is raised into its projected position.

At the time point at which the gears 18 and 19 have turned through 180<degrees>, the pins 18a and 19a reach their highest levels, and the display 20 arrives at its projected position. This fact is detected by a detection means not shown in the figures and the motor 12 is stopped, so that the display 20 remains held in its projected position. For performing such detection, the position of the display 20 may be directly detected, or alternatively the rotational amount of the gears 18 and 19 may be detected. Furthermore, if the stroke of the display 20 is short, the control may also be performed on a time basis.

When the display 20 is in its projected position, the dead weight of the display 20 acts upon the pins 18a and 19a by way of the support member 21. However, since the pins 18a and 19a are positioned at their highest levels, and since moreover the long slot 21a extends in the horizontal direction (which is the direction perpendicular to the direction of sliding of the display 20), therefore this load acting upon the pins 18a and 19a does not act as force for rotating the gears 18 and 19, i.e. does not act as force for lowering the display 20. Accordingly it is possible to prevent inadvertent dropping down of the display 20 without using any locking means, even if the weight of the display 20 is large.

When display retraction operation is performed in the state with the display 20 in its projected position, the motor 12 is operated to rotate in the same rotational direction as described above, and the display support member 21, in other words the display 20, is lowered by the movement of the pins 18a and 19a in the downward direction along with the rotation of the gears 18 and 19. At the time point at which the gears 18 and 19 have turned through 180<degrees>, the pins 18a and 19a reach their lowest levels, and the display 20 arrives at its stored position. This fact is detected by a detection means and the motor 12 is stopped.

Since in this manner, with this preferred embodiment, the raising and lowering operation of the display 20 is performed by rotating the motor 12 in one rotational direction only, thereby the construction of the motor drive circuit can be simplified, as compared to the case when the motor is rotationally driven both forwards and backwards. Further, since it is arranged that the motor 12 is stopped when it is detected that the display 20 has arrived at its projected position or at its stored position, thereby no discordant noise occurs such as might be generated if the display 20 came into contact with a stopper and was forcibly stopped.

Furthermore, while the display 20 is being raised or lowered, since the pins 18a and 19a move in the horizontal direction within the long slot 21a, thereby the movement in the sidewise direction of the pins 18a and 19a does not exert any influence upon the operation of the display 20. Strictly, although frictional force acts between the contacting portions of the rollers 18b and 19b and the wall surface of the long slot 21a, it is possible to suppress this frictional force since the rollers 18b and 19b rotate, so that it is possible to restrict the load of driving the display 20 to a minimum level.

Further, since the pins 18a and 19a execute circular motions around the centers of rotation of the gears 18 and 19, thereby the components of motion of the pins 18a and 19a in the upwards and downwards direction vary according to the angular positions of the gears 18 and 19. In concrete terms, from the state in which the pins 18a and 19a are at their lowest levels, the components of motion of the pins 18a and 19a gradually increase until the gears 18 and 19 have rotated through 90<degrees>, and thereafter gradually decrease until the pins 18a and 19a arrive at their highest levels. Due to this, at the beginning the display 20 gently rises, and little by little its speed increases, and after the gears 18 and 19 have rotated through 90<degrees> its speed decreases gradually, until finally it comes smoothly to a stop. The reverse action is the same as described above. Accordingly, without delicate control of the voltage supplied to the motor 12, it is possible to impart a high quality feeling to the operation of the display, and moreover to perform projection and storage in a short time period.

Moreover, with this embodiment, since both the drive mechanism 100 which transmits the driving force to the display unit (consisting of the display 20 and its support member 21) and the guide rods 31 and 32 which guide the movement of the display unit are mounted upon and fixed in position on the same member or the base 11, therefore the mutual positional accuracy attained between them is extremely high, and it is possible to suppress to a minimum level jerkiness, attributable to mounting inaccuracy, in the movement of the display unit. Furthermore, it is possible to absorb a certain amount of mounting inaccuracy, since as described above the engagement portion 21c of the one of the display support members 21 which is engaged with the guide rod 32 is free in the transverse direction. Yet further, with this construction, there is also the advantage that it is easy to perform the work of setting the display unit supported upon the guide rods.

Moreover, in the above embodiment the rotation of the gear portion 17a is transmitted to the pair of gears 18 and 19 and causes both these gears 18 and 19 to rotate in the same direction. However, it would also be acceptable for the gears 18 and 19 to be directly meshed together and to transmit the rotation of the gear portion 17a to only one of these gears 18 and 19, in which case the gears 18 and 19 would rotate in mutually opposite directions. Further, although in the above only one long slot 21a was provided in the display support member 21, it would also be acceptable for each of the gears 18 and 19 to be provided with its own slot, which would be shorter than the long slot 21a above. In this case an enhancement in the strength of the display support member would be anticipated, as compared to the case described above in which only one long slot is provided.

Furthermore it would also be acceptable to provide only one of the gears 18 and 19, or to provide three or more of such gears. If only one such gear were used, although it would be acceptable to position it at the center of the display in its longitudinal direction, it would be possible to reduce the amount of play when the display was being raised and lowered by providing it closer to the guide rod 31 than to the guide rod 32. It is true that, because in this case the force for raising or lowering the display 20 acts at a position displaced towards the guide rod 31 from the center of gravity of the display, therefore a torque is generated upon the display 20, and the amount of tilting of the display with respect to the guide rod 32 is increased. However it is possible to absorb a certain degree of tilting of the display 20, since the engagement portion 21c which engages with the guide rod 32 is shaped so as to be free in the transverse direction, so that it is possible to drive the display 20 smoothly.

Preferred Embodiment 2

Figure 6:
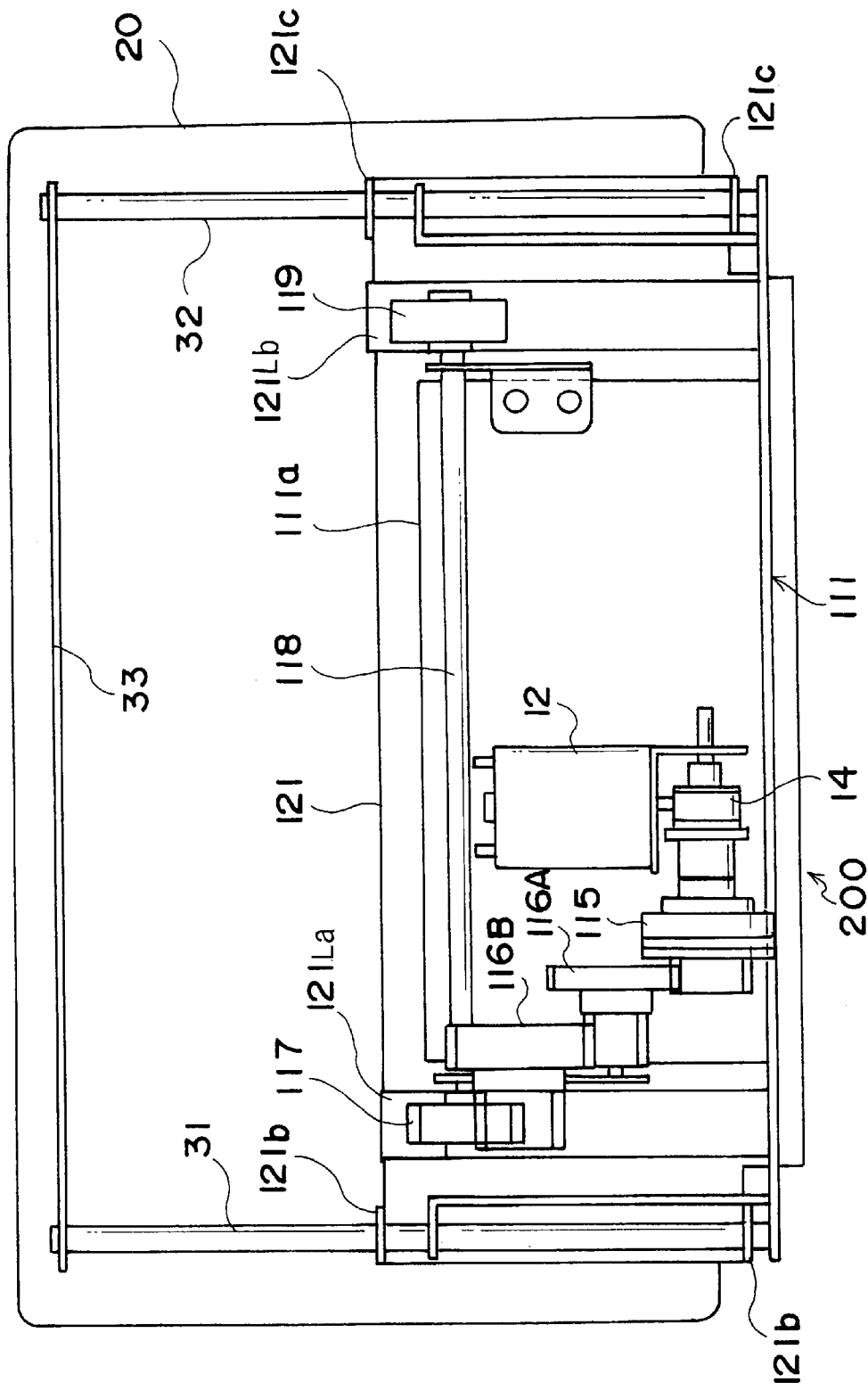
FIG. 6 is an elevation view of a display apparatus according to a second preferred embodiment of the present invention.

FIG. 6 shows a second preferred embodiment of this invention.

The display drive mechanism 200 of this embodiment is one in which the display is driven using a so-called rack and pinion mechanism. In the following description, constructional elements of this second preferred embodiment which correspond to ones in the first embodiment described above are labeled with the same reference numerals, and the description will focus upon the aspects in which this second embodiment differs from the first. The drive force of a motor 12 which is fixed to a standing wall portion 111a of a base 111 is transmitted to a pinion 117 via a worm 14, a gear member 115 which is provided with a clutch, and gear members 116A and 116B. One end of a shaft 118 is linked to the pinion 117, and the other end of the shaft 118 is linked to a pinion gear 119. Due to this, the rotation of the pinion 117 is transmitted to the pinion 119 via the shaft 118, and both the pinions 117 and 119 rotate synchronously. This pair of pinions 117 and 119 are respectively meshed with a pair of left and right side racks 121La and 121Lb formed in the display support member 121. When the pinions 117 and 119 rotate the display 20 is raised or lowered via the racks 121La and 121Lb.

In this embodiment, the display is raised by the motor 12 rotating in one rotational direction, and is lowered by it rotating in the other rotational direction. When the display 20 at the projected position or at the stored position is detected by a detection means not shown in the figures like the one described above with respect to the first preferred embodiment, the motor 12 is caused to be stopped, so that the display 20 is stopped. Alternatively, the display 20 or its support member 121 may be arranged to be stopped by coming into contact with a stopper. Moreover, in order to stop the display 20 gradually and smoothly as in the first preferred embodiment, the voltage supplied to the motor 12 may be appropriately varied according to the position of the display 20.

The movement of the display 20 is guided by a guide mechanism the same as that of the first preferred embodiment, in other words by a pair of guide rods 31 and 32 and engagement portions 121c and 121d of the support member 121 which engage with these rods. In this second preferred embodiment, the guide rods 31 and 32 and the display drive mechanism 200 are supported by the common member (the base 111). The engagement portion 121b is engaged with the guide rod 31 so that its position is determined with respect thereto both in the fore and aft direction and in the left and right direction. On the other hand, the engagement portion 121c is engaged with the guide rod 32 so that its position is determined with respect thereto in the fore and aft direction, while it is free in the left and right direction. Accordingly it is possible to drive the display unit smoothly. Furthermore the movement of the display 20 is locked by the engagement of the racks 121La and 121Lb with the pinions 117 and 119, so that there is no question of the display inadvertently dropping downwards.

Preferred Embodiment 3

Figure 7:
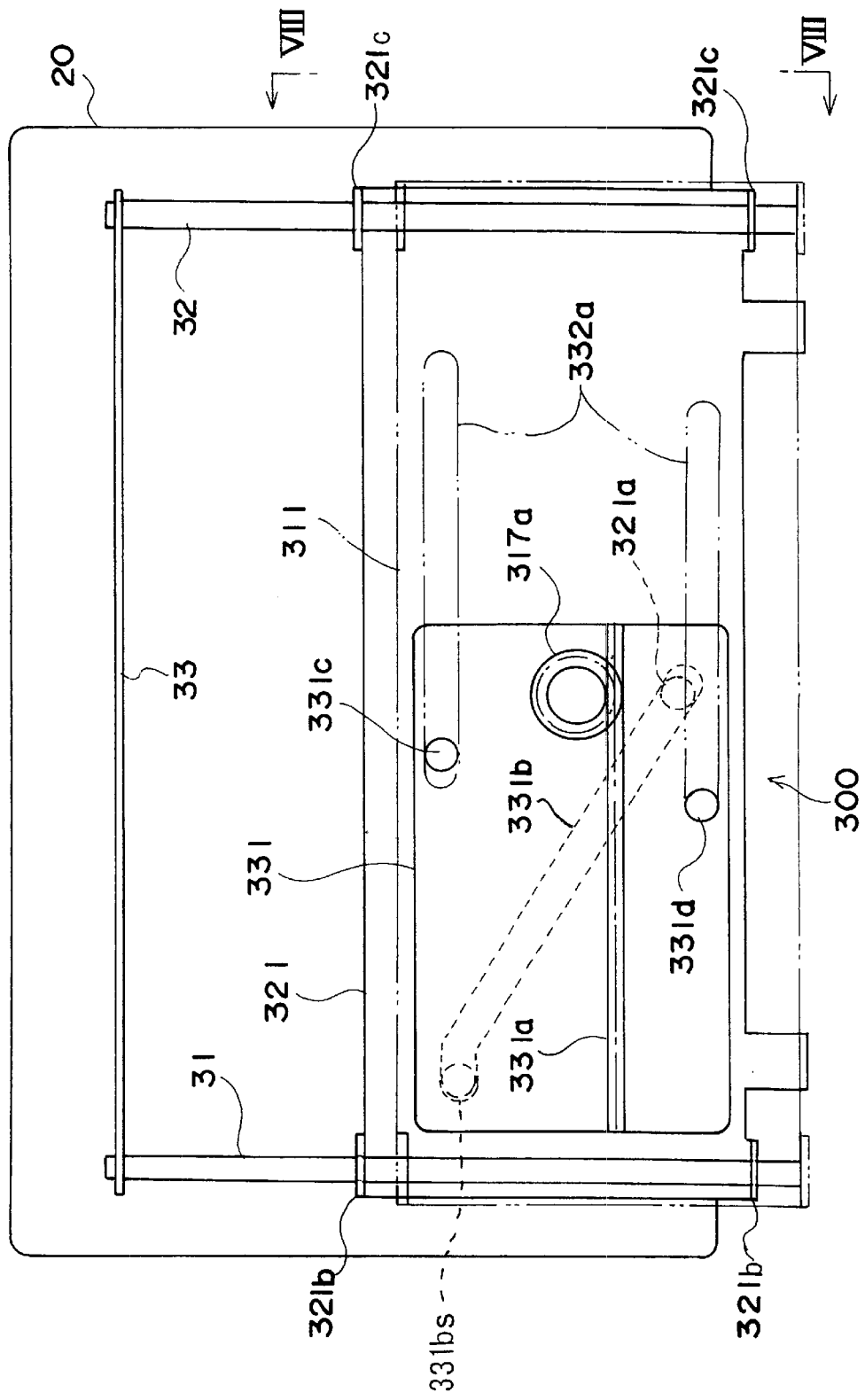
FIG. 7 is a rear view of a display apparatus according to a third preferred embodiment of the present invention.
Figure 8:
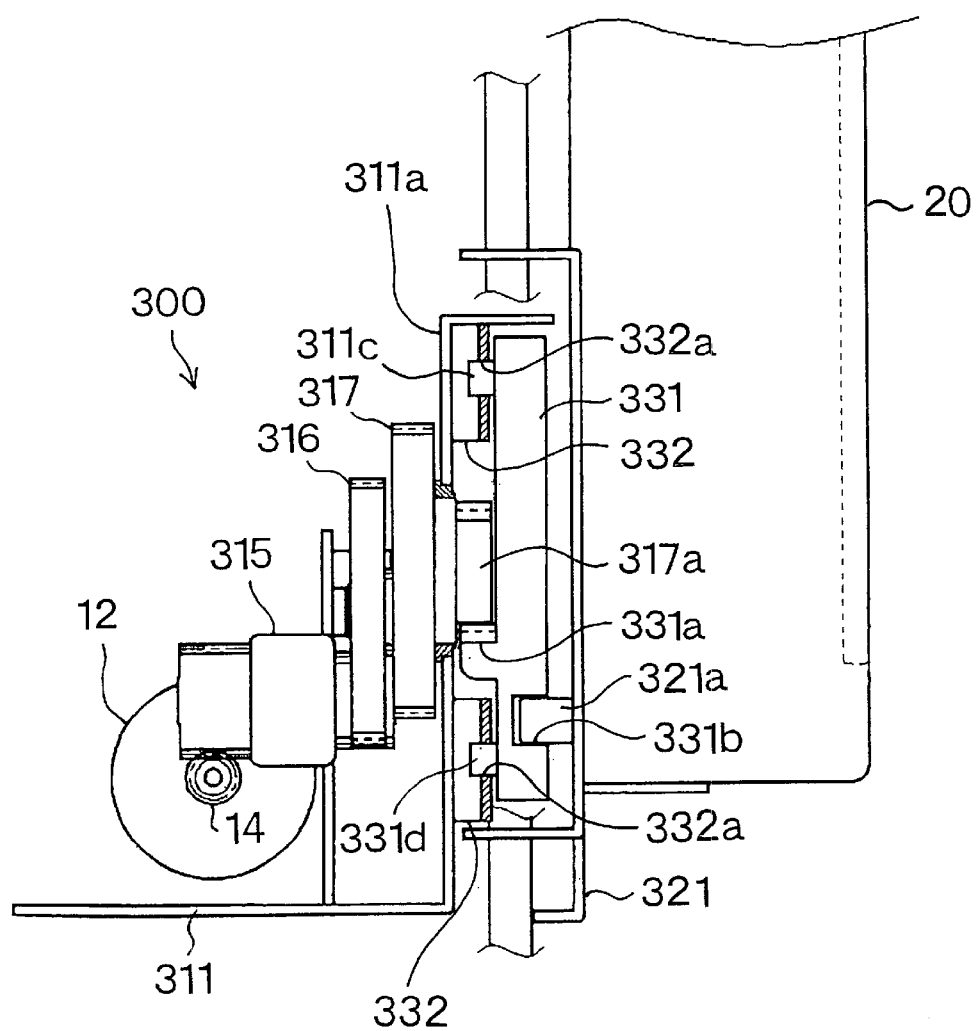
FIG. 8 is a sectional view taken through the FIG. 7 display apparatus in a plane shown by the arrows VIII—VIII in FIG. 7.

A third preferred embodiment will now be explained with reference to FIGS. 7 and 8. The display drive mechanism 300 of this embodiment is one in which the display is driven by using a slide cam. In the following description, constructional elements of this third preferred embodiment which correspond to ones in the embodiments described above are labeled with the same reference numerals.

The drive force of a motor 12 fixed to a base 311 is transmitted to a gear member 317 via a worm 314 and gear members 315 and 316. A portion 317a of the gear member 317 passes through a standing wall portion 311a of the base 311 and is meshed with a rack 331a of a slide cam 331. The slide cam 331 comprises a cam groove 331b, in which a pin 321a which projects from a display support member 321 is engaged, and a pair of upper and lower guide pins 331c and 331d. The slide cam 331 can move between the base 311 and the display 20 in the transverse direction (the longitudinal direction of the display 20). Transverse straight grooves 332a are formed in an upper and lower guide member 332 which is fixed to the standing wall portion 311a of the base 311, and the guide pins 331c and 331d of the slide cam 331 are engaged therein.

When the gear portion 317a of the gear member 317 is rotated by the motor 12, the slide cam 331 is slidingly moved in the transverse direction via the rack 331a. At this time, the movement of the slide cam 331 is guided by the movement of the guide pins 331c and 331d in the straight grooves 332a. The cam groove 331b moves along with the movement of the slide cam 331, and the display support member 321, i.e. the display 20, is raised and lowered via the pin 321a. In this case as well, the display 20 is raised by the rotation of the motor 12 in one rotational direction, while it is lowered by the rotation of the motor 12 in the other rotational direction. When the display 20 is in its projected position, the pin 321a reaches a horizontal portion 331bs of the cam groove 331b. Accordingly the display comes to be locked in this position, and there is no danger of the display 20 sinking downwards inadvertently.

The movement of the display 20 is guided by a pair of guide rods 31 and 32 and by engagement portions 321b and 321c of the support member 321 which engage with these rods, just as in the other embodiments described above. In this third preferred embodiment as well, the guide rods 31 and 32 and the display drive mechanism 300 are supported by the common member (the base 311). The engagement portion 321b is engaged with the guide rod 31 so that its position is determined with respect thereto both in the fore and aft direction and in the left and right direction. On the other hand, the engagement portion 321c is engaged with the guide rod 32 so that its position is determined with respect thereto in the fore and aft direction, while it is free in the left and right direction. Accordingly it is possible to drive the display unit smoothly.

When the display 20 is driven by using a cam groove as in this embodiment, the speed of movement of the display at any point of its travel can be freely varied by changing the shape of the cam groove. Accordingly, without any delicate control of the voltage supplied to the motor, a mode of operation becomes possible in which, for example, the display is initially driven quickly, and then gradually and smoothly it comes to a stop.

Although in the first preferred embodiment that was first explained above, along with providing the pins 18a and 19a on the gears 18 and 19, the long slot 21a was provided to the display assembly. However, an alternative construction is also acceptable, as for example shown in FIGS. 9 and 10, in which pins 521a project from the display support member 521, and cam grooves 18a' and 19a' are formed in gears 18' and 19', with the pins 521a being engaged in these grooves. In this case, it is possible to raise the display 20 by rotating the gears 18' and 19' in one rotational direction, and to lower the display 20 by rotating them in the other rotational direction. The stroke amount from the stored position to the projected position is designated as L in FIG. 10. In this case as well, without controlling the drive voltage supplied to the motor, it is possible to control the speed of movement of the display 20 by forming the cam grooves 18a' and 19a' appropriately, and thereby it is possible to impart a high quality feeling to the movement of the display.

Figure 11:
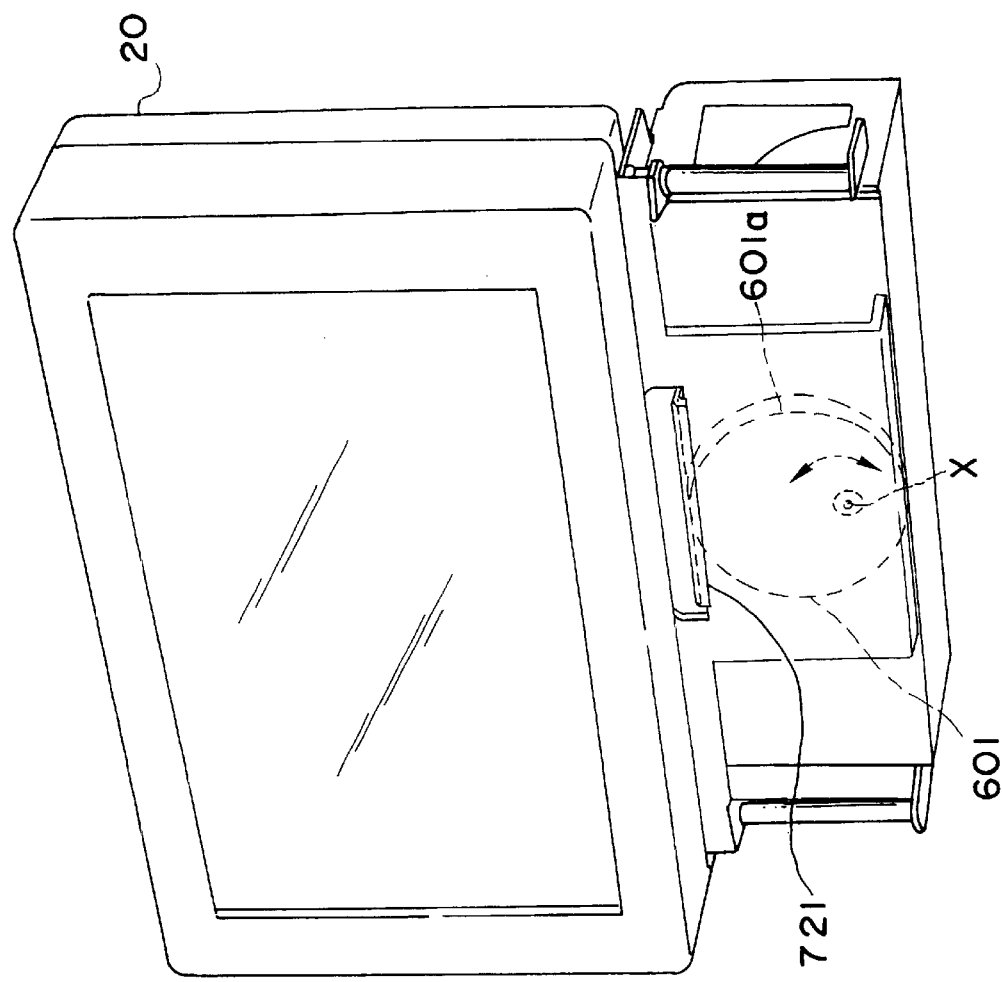
FIG. 11 is a perspective view of a display apparatus according to yet another preferred embodiment as seen from the front, shown in the state with the display in the projected position.

Further, instead of engagement between a pin and a groove, it is also possible to utilize a mechanism like that shown in FIG. 11. A rotating cam member 601 formed as a circular plate rotates about a point X positioned eccentrically from its center. The rotating cam member 601d is rotationally driven via a gear train by a motor, neither shown in the figure. A circumferential surface 601a (cam surface) of the cam member 601 is in contact with a contact face of a display support member 721. Since the center of rotation of the cam member 601 is eccentric, when it rotates its cam face 601a raises or lowers the display 20. In this case, the display 20 can raise and lower by rotating the motor in only one rotational direction. If this type of rotating cam member 601 is used, the speed of movement of the display can be varied by varying the shape of the cam. Accordingly, the shape of the cam member 601 is not to be considered as being limited to being circular.

Figure 9:
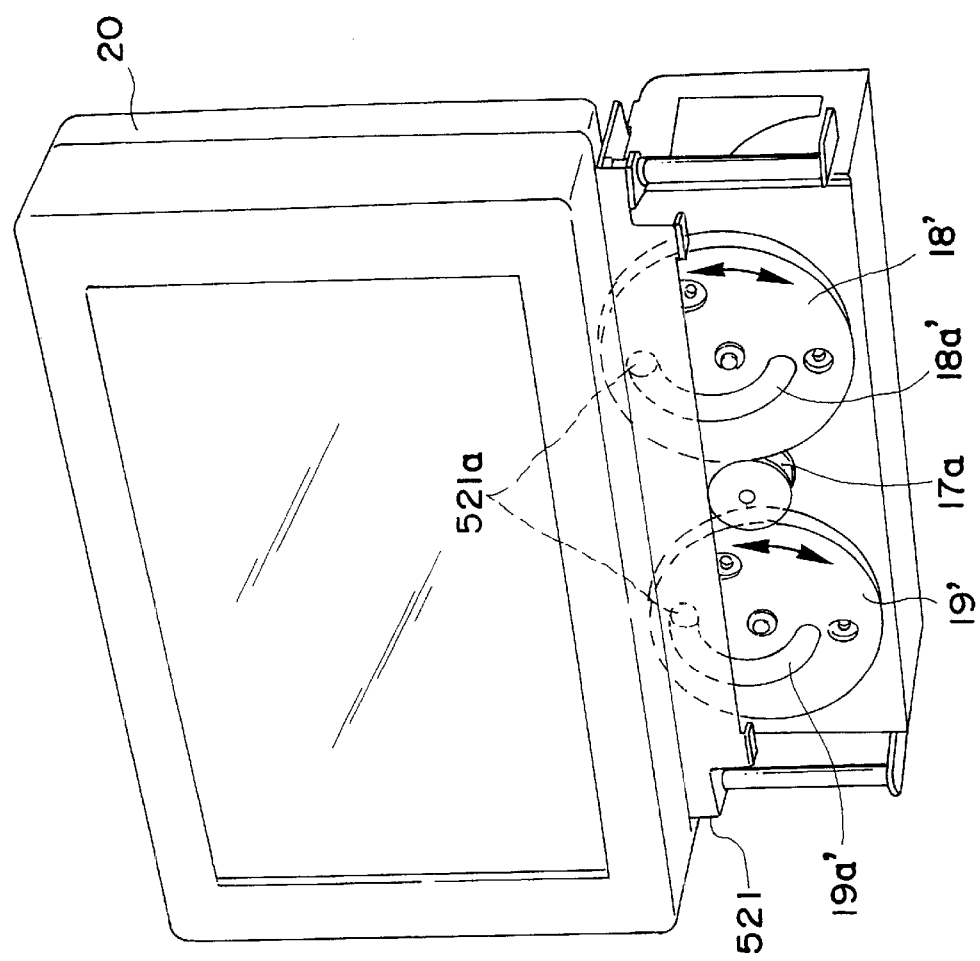
FIG. 9 is a perspective view of a display apparatus according to another preferred embodiment as seen from the front, shown in the state with the display in the projected position.
Figure 10:
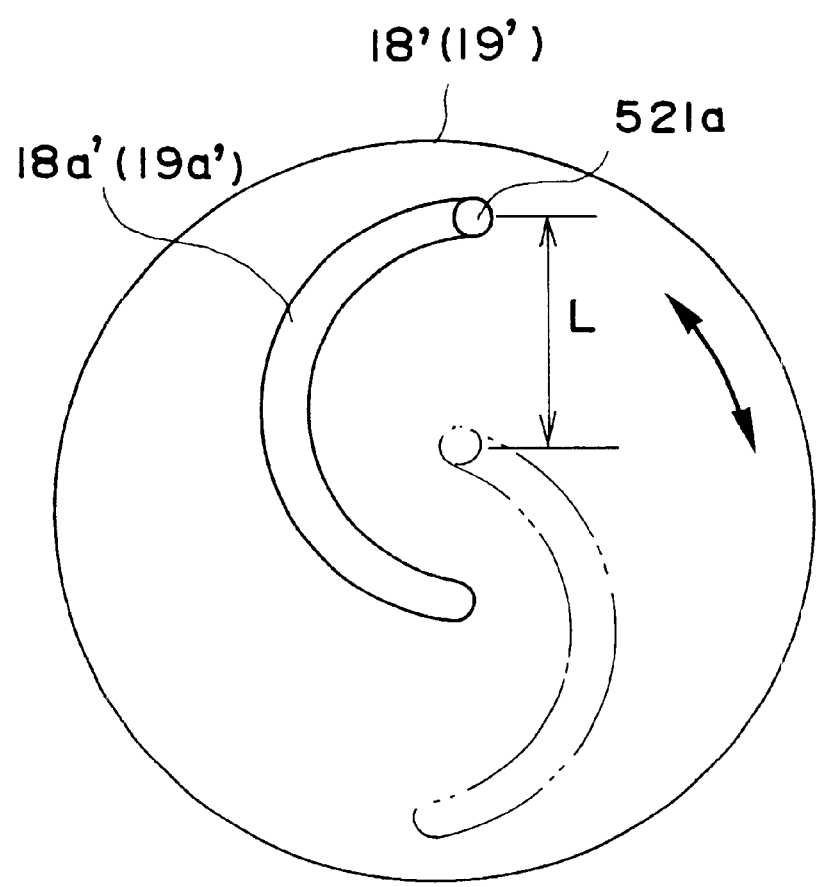
FIG. 10 is a figure showing a gear 18' (19') incorporated in the display apparatus shown in FIG. 9.

Moreover, in the examples shown in FIGS. 9 through 11, it is also possible to use a guide mechanism as explained with regard to the previous embodiments.

What is claimed is:

1. A display drive mechanism for vehicle which slidingly moves a display assembly between a stored position and a projected position by a drive force of a motor, comprising;

a rotating body which is rotationally driven by said motor, a projecting portion which projects from either one of said rotating body and said display assembly, and a groove which is provided to the other of said rotating body and said display assembly and engaged with said projecting portion, wherein;

said display assembly is driven to and fro in both directions between said stored position and said projected position by cam action of said projecting portion and said groove, as said rotating body rotates.

2. A display drive mechanism for vehicle according to claim 1, further comprising;

mutually parallel first and second guide rods which guide a sliding movement of said display assembly, said first and second guide rods being spaced apart along a first direction substantially perpendicular to a direction of projection of said projecting portion, a first engaging portion on said display assembly which engages with said first guide rod, said first engaging portion sliding on said first guide rod while being prohibited from moving in said first direction, and a second engaging portion on said display assembly which engages with said second guide rod, said second engaging portion sliding on said second guide rod while being permitted to move in said first direction wherein;

said rotating body is disposed nearer to said first guide rod than to said second guide rod.

3. A display drive mechanism for vehicle according to claim 1, wherein;

a movement amount of said display assembly is substantially half of a screen size of said display assembly in a movement direction of said display assembly.

4. A display drive mechanism for vehicle according to claim 1, wherein;

said projecting portion projects from said rotating body and said groove is formed as a long groove extending substantially perpendicular to the direction of sliding of said display assembly.

5. A display drive mechanism for vehicle which slidingly moves a display assembly between a stored position and a projected position by a drive force of a motor, comprising;

a pair of rotating bodies which are arranged along a direction perpendicular to the sliding direction of said display assembly and synchronously rotationally driven by said motor, a pair of projecting portions, each of which projects from one of said rotating bodies at a position thereof eccentric to its center of rotation, and a pair of grooves, each of which is provided to said display assembly and engaged with said projecting portion, wherein;

said display assembly is driven to and fro in both directions between said stored position and said projected position by movement of each of said projecting portions in said groove, as said rotating body rotates in one rotational direction.

6. A display drive mechanism for vehicle according to claim 5, wherein said grooves extend substantially perpendicular to a direction of sliding of said display assembly.

7. A display drive mechanism for vehicle according to claim 5, wherein;

a movement amount of said display assembly is substantially half of a screen size of said display assembly in a movement direction of said display assembly.

8. A display drive mechanism for vehicle which slidingly moves a display assembly between a stored position and a projected position by a drive force of a motor, comprising;

mutually parallel first and second guide rods which guide a sliding movement of said display assembly, said first and second guide rods being spaced apart along a first direction, a first engaging portion on said display assembly which engages with said first guide rod, said first engaging portion sliding on said first guide rod while being prohibited from moving in said first direction, and a second engaging portion on said display assembly which engages with said second guide rod, said second engaging portion sliding on said second guide rod while being permitted to move in said first direction.

9. A display drive mechanism for vehicle according to claim 8, wherein;

a movement amount of said display assembly is substantially half of a screen size of said display assembly in a movement direction of said display assembly.

10. A display apparatus for vehicle comprising;

a display assembly, and a display drive mechanism which slidingly moves said display assembly between a stored position and a projected position by a drive force of a motor, wherein said display drive mechanism comprises;

a rotating body which is rotationally driven by said motor, a projecting portion which projects from either one of said rotating body and said display assembly, and a groove which is provided to the other of said rotating body and said display assembly and engaged with said projecting portion, wherein said display assembly is driven to and fro in both directions between said stored position and said projected position by cam action of said projecting portion and said groove, as said rotating body rotates.

11. A display apparatus for vehicle according to claim 10, wherein;

a substantially upper half portion of a screen of said display assembly is exposed from an installation surface at said stored position and an entire screen of said display assembly is exposed from said installation surface at said projected position.

12. A display apparatus for vehicle comprising;

a display assembly, and a display drive mechanism which slidingly moves said display assembly between a stored position and a projected position by a drive force of a motor, wherein said display drive mechanism comprises;

a pair of rotating bodies which are arranged along a direction perpendicular to the sliding direction of said display assembly and synchronously rotationally driven by said motor and, a pair of projecting portions, each of which projects from each of said rotating bodies at a position thereof eccentric to its center of rotation, and a pair of grooves, each of which is engaged with said projecting portions, wherein said display assembly is driven to and fro in both directions between said pair of positions thereof by movement of each of said projecting portions in said groove, as said rotating body rotates in one rotational direction.

13. A display apparatus for vehicle according to claim 12, wherein;

a substantially upper half portion of a screen of said display assembly is exposed from an installation surface at said stored position and an entire screen of said display assembly is exposed from said installation surface at said projected position.

14. A display apparatus for vehicle comprising:

a display assembly and a display drive mechanism which slidingly moves said display assembly between a stored position and a projected position by a drive force of a motor, wherein; said display drive mechanism comprising;

a first and second guide rods spaced apart along a first direction, a first engaging portion on said display assembly which engages with said first guide rod, said first engaging portion sliding on said first guide rod while being prohibited from moving in said first direction, and a second engaging portion on said display assembly which engages with said second guide rod, said second engaging portion sliding on said second guide rod while being permitted to move in said first direction.

15. A display apparatus for vehicle according to claim 14, wherein;

a substantially upper half portion of a screen of said display assembly is exposed from an installation surface at said stored position and an entire screen of said display assembly is exposed from said installation surface at said projected position.

16. A display apparatus for vehicle, comprising;

a display assembly, a display drive mechanism which slidingly moves said display assembly between a stored position and a projected position, a support member which supports said display drive mechanism in position, and a guide mechanism which is supported in position by said support member and guides the movement of said display assembly, wherein, a substantially upper half portion of a screen of said display assembly is exposed from an installation surface at said stored position and an entire screen of said display assembly is exposed from said installation surface at said projected position, and at said stored position of said display assembly, information is displayed in the substantially upper half portion of said screen, and at said projected position of said display assembly, information is displayed in the entire portion of said screen.

* * * * *